United States Patent
Bykampadi et al.

(10) Patent No.: US 12,425,388 B2
(45) Date of Patent: Sep. 23, 2025

(54) ENHANCED HOP BY HOP SECURITY

(71) Applicant: Nokia Technologies Oy, Espoo (FI)

(72) Inventors: Nagendra Bykampadi, Bangalore (IN); Bruno Landais, Pleumeur-Bodou (FR); Silke Holtmanns, Klaukkala (FI); Jani Petteri Ekman, Kangasala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 669 days.

(21) Appl. No.: 17/159,346

(22) Filed: Jan. 27, 2021

(65) Prior Publication Data
US 2021/0306326 A1  Sep. 30, 2021

(30) Foreign Application Priority Data

Mar. 27, 2020 (IN) .............................. 202041013502

(51) Int. Cl.
*H04L 9/32* (2006.01)
*H04L 9/30* (2006.01)
(Continued)

(52) U.S. Cl.
CPC ............ *H04L 63/0823* (2013.01); *H04L 9/30* (2013.01); *H04L 67/56* (2022.05)

(58) Field of Classification Search
CPC ....... H04L 63/0823; H04L 9/30; H04L 67/56; H04L 2209/76; H04L 9/3247;
(Continued)

(56) References Cited

U.S. PATENT DOCUMENTS

2023/0131703 A1* 4/2023 Mahajan ............. H04L 63/0823
713/153

FOREIGN PATENT DOCUMENTS

| CN | 206797564 A | 5/2017 | |
|---|---|---|---|
| EP | 3709580 A1 * | 9/2020 | ......... H04L 12/4633 |
| IN | 201747005219 A | 2/2017 | |
| WO | 02/054665 A1 | 7/2002 | |

(Continued)

OTHER PUBLICATIONS

Jaeduck Choi; Souhwan Jung; Kwangyong Bae; Hokun Moon; "A lightweight authentication and hop-by-hop security mechanism for SIP network"; 2008 International Conference on Advanced Technologies for Communications; Year: 2008 | Conference Paper | Publisher: IEEE; pp. 235-238 (Year: 2008).*

(Continued)

*Primary Examiner* — Fatoumata Traore
*Assistant Examiner* — Courtney D Fields
(74) *Attorney, Agent, or Firm* — Lippes Mathias LLP

(57) ABSTRACT

Embodiments of the present disclosure relate to methods, apparatuses and computer readable storage media for hop-by-hop security. A proposed method comprises receiving, at a first apparatus and from a second apparatus associated with a first network function, a message directed from the first network function to a second network function, the message comprising a first signature and network function information, the network function information at least comprising identification information of the first network function; in accordance with a successful validation of the first signature, updating the message with a second signature specific to a service communication proxy implemented by the first apparatus; and transmitting the updated message to a third apparatus associated with the second network function, the updated message comprising at least the second signature and the network function information.

19 Claims, 9 Drawing Sheets

(51) Int. Cl.
*H04L 9/40* (2022.01)
*H04L 12/66* (2006.01)
*H04L 67/56* (2022.01)
*H04W 12/10* (2021.01)
*H04W 92/24* (2009.01)

(58) Field of Classification Search
CPC .... H04L 63/0281; H04L 63/12; H04W 12/10; H04W 12/02
See application file for complete search history.

(56) References Cited

FOREIGN PATENT DOCUMENTS

| | | | |
|---|---|---|---|
| WO | WO-2019163810 A1 * | 8/2019 | ......... H04L 12/4633 |
| WO | 2019/193252 A1 | 10/2019 | |
| WO | WO-2019214942 A1 * | 11/2019 | ......... H04L 63/0428 |

OTHER PUBLICATIONS

"3rd Generation Partnership Project; Technical Specification Group Services and System Aspects; Security architecture and procedures for 5G system (Release 16)", 3GPP TS 33.501, V16.1.0, Dec. 2019, pp. 1-202.

"3rd Generation Partnership Project; Technical Specification Group Core Network and Terminals; 5G System; Technical Realization of Service Based Architecture; Stage 3 (Release 16)", 3GPP TS 29.500, V16.2.1, Jan. 2020, pp. 1-50.

"3rd Generation Partnership Project; Technical Specification Group Core Network and Terminals; 5G System; Network Function Repository Services; Stage 3 (Release 16)", 3GPP TS 29.510, V16.2.0, Dec. 2019, pp. 1-167.

"3rd Generation Partnership Project; Technical Specification Group Core Network and Terminals; 5G System; Principles and Guidelines for Services Definition; Stage 3 (Release 16)", 3GPP TS 29.501, V16.2.0, Dec. 2019, pp. 1-71.

Fielding et al., "Hypertext Transfer Protocol (HTTP/1.1): Semantics and Content", RFC 7231, Internet Engineering Task Force (IETF), Jun. 2014, pp. 1-101.

Petersson et al., "Forwarded HTTP Extension", RFC 7239, Internet Engineering Task Force (IETF), Jun. 2014, pp. 1-16.

McGrew et al., "Cryptographic Algorithm Implementation Requirements and Usage Guidance for Encapsulating Security Payload (ESP) and Authentication Header (AH)", RFC 7321, Internet Engineering Task Force (IETF), Aug. 2014, pp. 1-11.

Adams et al., "Internet X.509 Public Key Infrastructure Time-Stamp Protocol (TSP)", RFC 3161, Network Working Group, Aug. 2001, pp. 1-26.

Extended European Search Report received for corresponding European Patent Application No. 21156730.0, dated Aug. 3, 2021, 8 pages.

* cited by examiner

ENHANCED HOP BY HOP SECURITY

TECHNICAL FIELD

Embodiments of the present disclosure generally relate to the field of telecommunication, and in particular, to apparatuses, methods and computer readable storage media for enhanced hop by hop security.

BACKGROUND

In the 3rd Generation Partnership Project (3GPP) Release 16 (Rel-16), the 5G core network (5GC) Service Based Architecture (SBA) has been extended from direct communication to indirect communication between two network functions (NFs). This means that at least one service communication proxy (SCP) may be in the path of communication between two NFs. The SCP is an intermediate function covering delegated NF discovery to help resolving the target NF producer instances and delegated routing to help route Control Plane messages between two NFs.

In indirect communication, there is no direct connectivity between the NFs. The communication between NFs will be protected hop-by-hop. For example, a NF acting as a service consumer (which may be referred to as "NF consumer" or "NFc" in the following) may establish a secure pipe to a SCP (which may be referred to as "SCPc" in the following), the SCPc may establish a secure pipe to another SCP (which may be referred to as "SCPp" in the following), and the SCPp may establish a secure pipe to a NF acting as a service producer (also referred to as "NF producer" or "NFp" in the following). Such indirect communication between NFs changes and extends the security model for the communication.

SUMMARY

In general, example embodiments of the present disclosure provide apparatuses, methods and computer readable storage media for enhanced hop by hop security.

In a first aspect, there is provided a first apparatus. The first apparatus comprises at least one processor; and at least one memory including computer program codes; the at least one memory and the computer program codes are configured to, with the at least one processor, cause the first apparatus to receive, from a second apparatus associated with a first network function, a message directed from the first network function to a second network function, the message comprising a first signature and network function information, the network function information at least comprising identification information of the first network function: in accordance with a successful validation of the first signature, update the message with a second signature specific to a service communication proxy implemented by the first apparatus; and transmit the updated message to a third apparatus associated with the second network function, the updated message comprising at least the second signature and the network function information.

In a second aspect, there is provided a second apparatus. The second apparatus comprises at least one processor; and at least one memory including computer program codes: the at least one memory and the computer program codes are configured to, with the at least one processor, cause the second apparatus to generate a signature based on network function information, the network function information at least comprising identification information of the first network function, the signature specific to a first network function implemented by the second apparatus: generate a message directed from the first network function to a second network function, the message comprising the signature and the network function information; and transmit the message to a first apparatus, the first apparatus configured to implement a service communication proxy connected to the first network function.

In a third aspect, there is provided a third apparatus. The third apparatus comprises at least one processor; and at least one memory including computer program codes: the at least one memory and the computer program codes are configured to, with the at least one processor, cause the third apparatus to receive, from a first apparatus configured to implement a service communication proxy, a message directed from a first network function to a second network function implemented by the third apparatus: validate a signature specific to the service communication proxy in the message, the message further comprising network function information, the network function information at least comprising identification information of the first network function; and in accordance with a successful validation of the signature, obtain the identification information of the first network function from the message.

In a fourth aspect, there is provided a method. The method comprises receiving, at a first apparatus and from a second apparatus associated with a first network function, a message directed from the first network function to a second network function, the message comprising a first signature and network function information, the network function information at least comprising identification information of the first network function: in accordance with a successful validation of the first signature, updating the message with a second signature specific to a service communication proxy implemented by the first apparatus; and transmitting the updated message to a third apparatus associated with the second network function, the updated message comprising at least the second signature and the network function information.

In a fifth aspect, there is provided a method. The method comprises generating, at a second apparatus, a signature based on network function information, the network function information at least comprising identification information of the first network function, the signature specific to a first network function implemented by the second apparatus: generating a message directed from the first network function to a second network function, the message comprising the signature and the network function information; and transmitting the message to a first apparatus, the first apparatus configured to implement a service communication proxy connected to the first network function.

In a sixth aspect, there is provided a method. The method comprises receiving, at a third apparatus and from a first apparatus configured to implement a service communication proxy, a message directed from a first network function to a second network function implemented by the third apparatus: validating a signature specific to the service communication proxy in the message, the message further comprising network function information, the network function information at least comprising identification information of the first network function; and in accordance with a successful validation of the signature, obtaining the identification information of the first network function from the message.

In a seventh aspect, there is provided a first apparatus comprising: means for receiving, from a second apparatus associated with a first network function, a message directed from the first network function to a second network function, the message comprising a first signature and network function information, the network function information at least comprising identification information of the first network function: means for in accordance with a successful validation of the first signature, updating the message with a second signature specific to a service communication proxy implemented by the first apparatus; and means for transmitting the updated message to a third apparatus associated with the second network function, the updated message comprising at least the second signature and the network function information.

In an eighth aspect, there is provided a second apparatus comprising means for generating a signature based on network function information, the network function information at least comprising identification information of the first network function, the signature specific to a first network function implemented by the second apparatus: means for generating a message directed from the first network function to a second network function, the message comprising the signature and the network function information; and means for transmitting the message to a first apparatus, the first apparatus configured to implement a service communication proxy connected to the first network function.

In a ninth aspect, there is provided a third apparatus comprising means for means for receiving, from a first apparatus configured to implement a service communication proxy, a message directed from a first network function to a second network function implemented by the third apparatus: means for validating a signature specific to the service communication proxy in the message, the message further comprising network function information, the network function information at least comprising identification information of the first network function; and means for in accordance with a successful validation of the signature, obtaining the identification information of the first network function from the message.

In a tenth aspect, there is provided a non-transitory computer readable medium comprising program instructions for causing an apparatus to perform at least the method according to the above fourth aspect.

In an eleventh aspect, there is provided a non-transitory computer readable medium comprising program instructions for causing an apparatus to perform at least the method according to the above fifth aspect.

In a twelfth aspect, there is provided a non-transitory computer readable medium comprising program instructions for causing an apparatus to perform at least the method according to the above sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
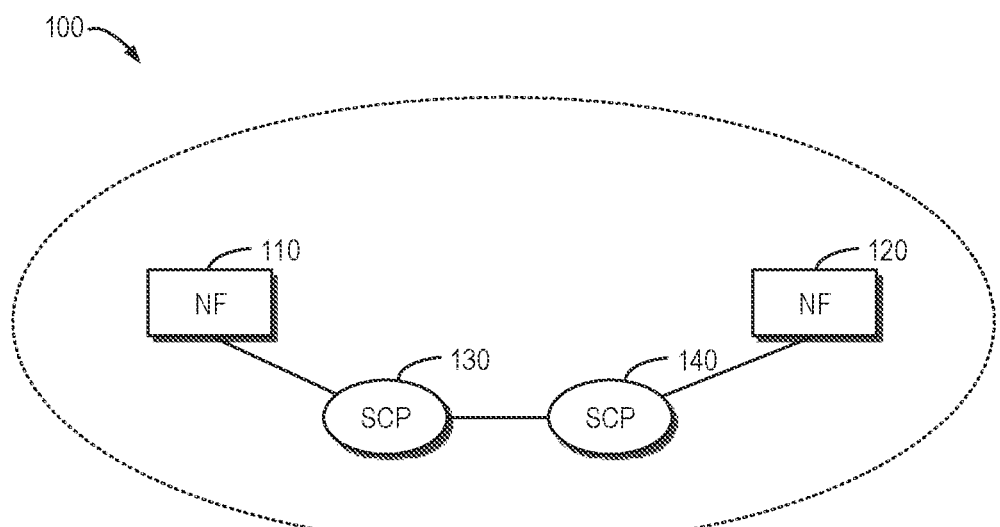
FIG. 1 illustrates a block diagram of an example environment in which some example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As mentioned above, in 5GC SBA, the communication between NFs is will be protected under hop by hop security, which is based on the transitive trust model (for example, A trusts B, C trusts B, thus C trusts A). While this model may be sufficient in 4G networks where the topology of the network is statically configured, physically isolated and peer to peer, this is insufficient in 5G networks where the 5GC is fully cloud native with virtualized NFs sharing hardware with other NFs and there is no physical isolation between NFs. Therefore, a mechanism is needed that enables the receiving NF to reliably authenticate the sending NF in virtualized networks.

Embodiments of the present disclosure provide a solution for hop-by-hop security. In this solution, a sending NF (for example, a NFc) may transmit a message (for example, a Service Request) directed to a receiving NF (for example, a NFp) to a first SCP (for example, a SCPc). The message may include a signature specific to the sending NF and network function information of the sending NF. The network function information may include identification of the sending NF, for example NF instance ID of the sending NF, and may further include temporal information (for example, timestamp) concerning transmission of the message. In some example embodiments, the network function information may further include certificate information of the sending NF specific to the private key used in generating the signature. After successfully validate the signature specific to the sending NF, the first SCP may update the message by replacing the signature of the sending NF with its own signature or by inserting its own signature into the message. In the case of replacing the signature of the sending NF, the network function information (for example including identification information, temporal information, et al) is digitally signed to generate the signature of the first SCP. In the case of inserting the signature of the first SCP, the network function information (for example including identification information, temporal information, and certificate information) and the signature of the sending NF are digitally signed to generate the signature of the first SCP: alternatively, only the signature of the sending NF is digitally signed.

The first SCP then sends the updated message to a second SCP, for example, a SCPp. After successfully validate the signature of the first SCP, the second SCP may further update the message by replacing the signature of the first SCP with its own signature. Then, the second SCP may transmit the further updated message to the receiving NF. After successfully validate the signature of the second SCP, the receiving NF may obtain the identification information of the sending NF. The receiving NF also validates the signature of the sending NF, if present in the received message. In some example embodiments, the signature and the network function information may be carried by a header inserted into the message.

In another case, the sending NF and the receiving NF may communicate directly (i.e. without any SCP in between), e.g. in the case of Notification message from NF producer to NF consumer. In this case, the receiving NF validate the signature of the sending NF.

In the proposed solution, the addition of the signature and the network function (for example, a specially customized header for NF instances) and related modification functionality at intermediate nodes (for example, the first and second SCPs) can enable the receiving NF to reliably determine the identification (for example, NF Instance Id, Fully Qualified Domain Name FQDN etc.) of the sending NF. The proposed solution does not violate Rel-15 and is backward compatible and thus can work also across networks.

Reference is now made to FIG. 1, which illustrates a block diagram of an environment 100 in which some example embodiments of the present disclosure can be implemented. FIG. 1 illustrates an example environment 100 for the indirect communication scenario.

As shown in FIG. 1, the environment 100 comprises NFs 110 and 120, a SCP 130 connected to the NF 110, a SCP 140 connected to the NF 120. The SCPs 130 and 140 can be implemented in a same physical device or different physical devices. The NFs 110 and 120 can be implemented in a same physical device or different physical devices. In some example embodiments, the NFs 110 and 120 and the SCPs 130 and 140 as well as other elements may be implemented at the same node. For example, a SCP can be co-located with a network repository function (NRF), and a SCP (instance) can also be co-located with a Security Edge Protection Proxy (SEPP). In some example embodiments, one or more of the NFs 110 and 120 and the SCPs 130 and 140 and NRF, SEPP, et al, may operate as a service by a third party and therefore a message may be routed forth and back to the third party.

Only for the purpose of illustration, in the following, the NF 110 may be also referred to as "first NF 110", and the NF 120 may be also referred to as "second NF 120". The SCP 130 connected to the first NF 110 may be also referred to "first SCP 130", and the SCP 140 connected to the second NF 120 may be also referred to as "second SCP 140". In some example embodiments, the NF 110 may act as a service consumer, which may request a service from the NF 120 acting as a service producer. In such example embodiments, the first NF 110 may be referred to as "NFc 110" and the second NF 120 may be also referred to as "NFp 120". Accordingly, the first SCP 130 connected to the NFc 110 may be referred to as "SCPc 130", and the second SCP 140 connected to the NFp 120 may be also referred to as "SCPp 140".

As shown in FIG. 1, the first NF 110 and the second NF 120 are not directly connected to the each other. The SCPs 130 and 140 act as intermediate nodes between the NFs 110 and 120. It is to be understood that the number of SCPs shown in FIG. 1 is merely for illustrative purpose without any limitation and there may be less or more SCPs between the NFs 110 and 120. In some example embodiments, there may be only one SCP between the NFs 110 and 120. For example, in the case where the first NF 110 acts as a NF service consumer requesting service from the second NF 120 which is a NRF, the two NFs 110 and 120 may be connected to the same SCP. In some example embodiments, there may be more than two SCPs between the NFs 110 and 120.

It is to be understood that the network environment 100 is shown only for purpose of illustration, without suggesting any limitation to the scope of the present disclosure. Embodiments of the present disclosure may also be applied to an environment with a different structure.

Figure 2:
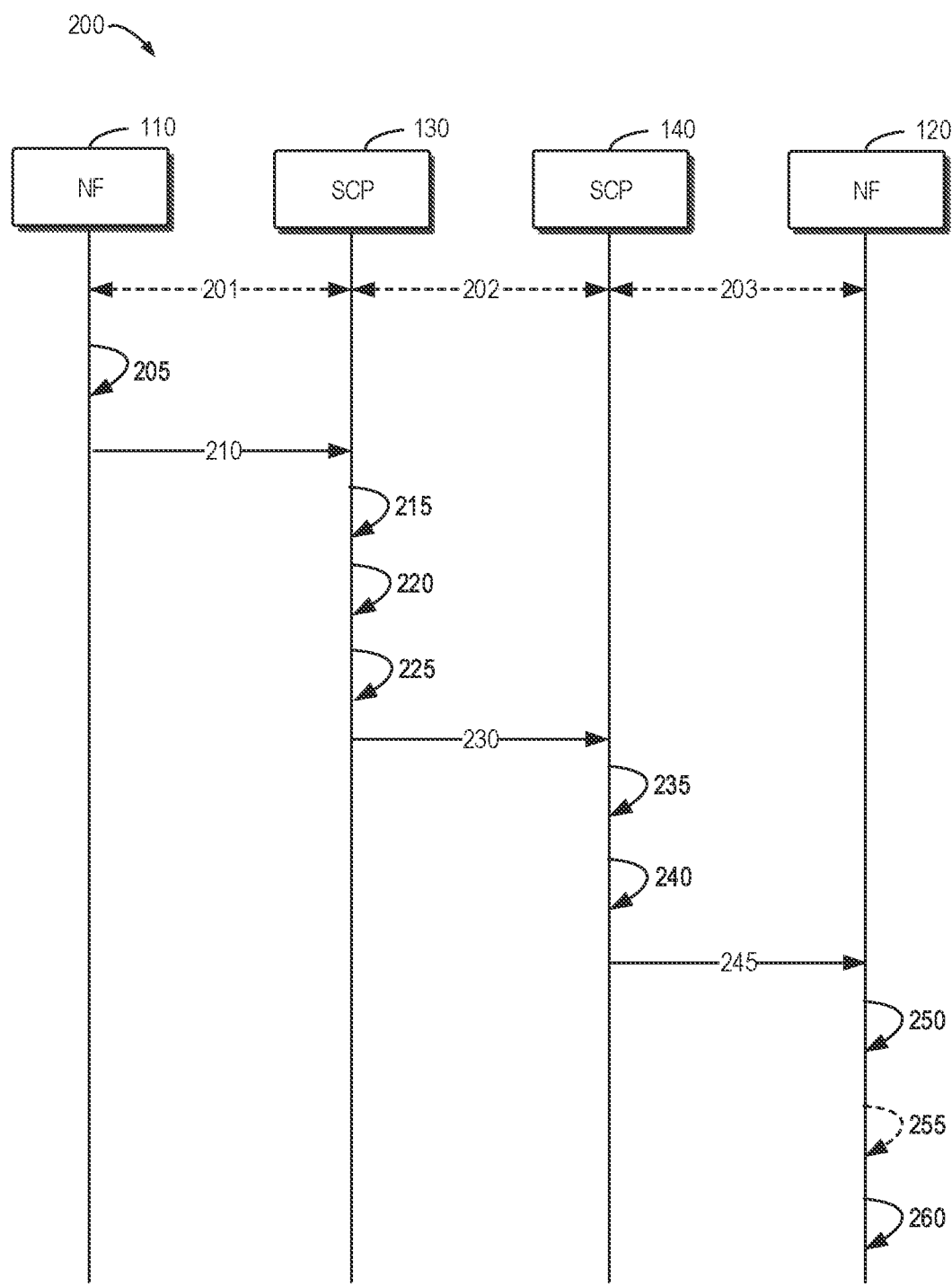
FIG. 2 illustrates an interaction diagram of an example process for hop by hop security in indirect communication according to some example embodiments of the present disclosure.

FIG. 2 illustrates an interaction diagram of an example process 200 for hop by hop security in indirect communication according to some example embodiments of the present disclosure. As shown in FIG. 2, the process 200 may involve the NF 110, the SCP 130 and the SCP 140, and the NF 120 as shown in FIG. 1.

It is to be understood that although the process 200 (and also the process 400 described below) involves the NF 110, the SCP 130 and the SCP 140, and the NF 120, for example the hop-by-hop security between "NFc->SCPc->SCPp->NFp", the same mechanism can also be used in other communication direction or scenarios. For example, the mechanism can be used to the direction from "NFp" to "NFc", which then allows the NFc to validate the identity of the NFp for callback URIs, for instance. Moreover, the mechanism can potentially also be used for the scenario of "NFc->SCPc->NRF" as well as for the scenario of "NRF1->NRF2->NRF3". For example, the mechanism can be used for validating the identity of NFc with hierarchical NRF setups when Nnrf Service application programming interface (API) request is routed via one or more intermediate forwarding NRFs; but also for identifying NRFs for each other in this case. Therefore, in some example embodiments, the receiving NF may be a NRF.

In some example embodiments, as a pre-requisite to the process detailed below, mutual authentication between the NF 110 and the SCP 130 is performed 201, mutual authentication between the SCP 130 and the SCP 140 is performed 202, and mutual authentication between the NF 120 and the SCP 140 is performed 203. For example, Transport Layer Security (TLS) handshake procedures may be performed for the mutual authentications. In this way, secure connections using TLS (also referred to as "TLS connection" in the following) can be established between the NF 110 and the SCP 130, between the SCP 130 and the SCP 140, and between the SCP 140 and the NF 120. For example, during the TLS handshake between the NF 110 and the SCP 130, the client certificate of the NF 110 can be provided or indicated to the SCP 130. The SCP 140 and the NF 120 can obtain the corresponding client certificates, respectively. In the example process of present disclosure, the certificates of the TLS handshake can be used to bind the lower transport layer to the upper application layer and thus provides a better security.

The first NF 110 may intend to transmit a message to the second NF 120. Such a message may be referred to as a message directed from the first NF 110 to the second NF 120 herein. For example, in the case where the first NF 110 acts a NFc and the second NF 120 acts as a NFp, such a message may be a Service Request. In the case where the first NF 110 acts a NFp and the second NF 120 acts as a NFc, such a message may be a Notification Message. In the example shown in FIG. 2, the first NF 110 may also be referred to as a sending NF 110 and the second NF 120 may be also referred to as receiving NF 120.

To support the enhance hop-by-hop security, a signature and network function information (NF info) of the sending NF 110 may be inserted in the message directed to the receiving NF 120. The NF info at least comprises identification information of the sending NF 110, which may be used to identify the NF instance of the sending NF 110. In some example embodiments, the identification information may be the NFInstanceId, NF Set Id (if the sending NF 110 belongs to a Set) of the sending NF 110 or both. The NFInstanceId may represent an identifier, provided by a NF, that shall be globally unique inside the Public Land Mobile Network (PLMN) of the NRF where the NF is being registered. The NF Set Id is a globally unique identifier of a set of equivalent and interchangeable CP NFs from a given network that provide distribution, redundancy and scalability.

In some example embodiments, the NF info may further comprise temporal information concerning transmission of the message for purpose of replay protection. As an example, a timestamp based on RFC 7321 or RFC 3161 may be added as the temporal information. In some example embodiments, in addition to adding the timestamp, the sending NF 110 may also add delay information, for example "AcceptableDelay" that provides guidance to the receiving NF 120 on the time window that is considered to be valid. In some example embodiments, alternatively, the receiving NF 120 may determine the acceptable time window based on an estimate of the hop by hop delay, etc. In some example embodiments, the NF info may further comprise type information of the sending NF 110 and certificate information of the sending NF 110, which will be detailed with reference to FIGS. 4 and 5 below.

The sending NF 110 generates 205 a signature. For example, the sending NF 110 may generate the signature based on the NF info to be transmitted and the private key of the sending NF 110. This digital signature may be generated using the private key corresponding to the public key in the TLS certificate. Alternatively, a new certificate may be provisioned by the operator for generating the digital signature. This additionally means that this new certificate is made available to all entities that need to validate the signature.

Then, the sending NF 110 may generate the message including the NF info and the signature specific to the sending NF 110. The message (for example, Service Request) is transmitted 210 or forwarded to the first SCP 130 to which the sending NF 110 is communicating with and has established a secure TLS based connection.

Figure 3:
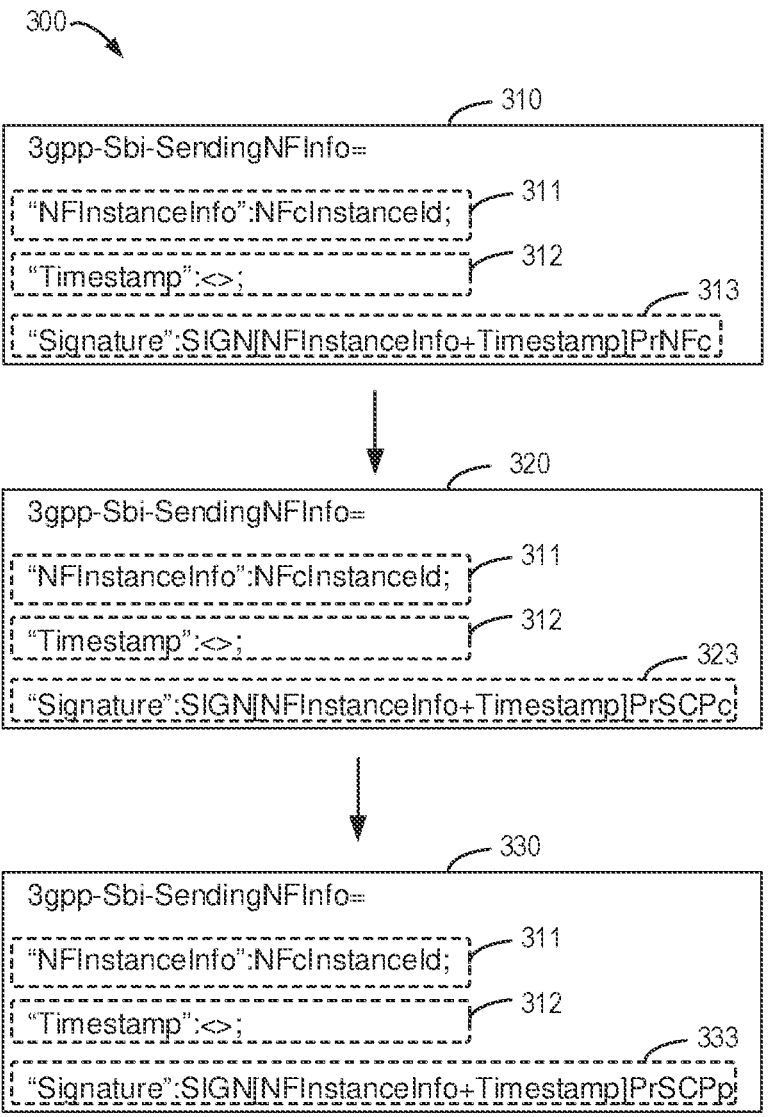
FIG. 3 illustrates a schematic diagram showing example headers during indirect communication according to some example embodiments of the present disclosure.

The NF info and the signature may be transmitted in a header which is inserted into the message (for example, a Service Request). Reference is now made to FIG. 3, which illustrates a schematic diagram 300 showing example headers during indirect communication according to some example embodiments of the present disclosure. In the example, the example HTTP custom header 310 (which may be referred to shortly as header in the following), named "3gpp-Sbi-SendingNFInfo", may be inserted by the sending NF 110, where Sbi is short for service based interface. Moreover, in the example, the sending NF 110 acts as a NFc and the message transmitted 210 is the Service Request.

The "NFInstanceInfo" field 311 represents the identification information, which in this example is the NFInstanceId of the NFc 110. The "Timestamp" field 312 represents the temporal information. The "Signature" field 313 of the header 310 contains the signature appended by the sending NF 110 for "NFInstanceInfo" and "Timestamp". The signature in the "Signature" field 313 may be generated by signing the content or an abstract of the content of "NFInstanceInfo" and "Timestamp" with the private key of the sending NF 110, which is shown as "PrNFc" in the example. It is to be understood that the signature in "Signature" field 313 is only an example without limitation. For example, in the case where the sending NF is NFp, the private key of the NFp (such as PrNFp) can be used for signing purpose.

Although not shown in FIG. 3, the algorithm used to generate the signature may be also included in the header 310, for example in the field of "Algorithm". Such a header or similar header may be also referred to as HTTP (Secure Hypertext Transfer Protocol) header.

It is to be understood that the "3gpp-Sbi-SendingNFInfo" headers shown in FIG. 3 are merely exemplary without limitation. Other headers such as "Forwarded" as defined in RFC 7239 can be used.

In some example embodiments, as mentioned above, the NF info may comprise the type information of the sending NF 110, for example the NF type. The sending NF 110 may additionally transmit the NF type in the "3gpp-Sbi-SendingNFInfo header" 310. The NF type may be transmitted in the "NFInstanceInfo" field 311 of the header 310 or in additional field.

In the "3gpp-Sbi-SendingNFInfo" header 310, the "Timestamp" field 312 is used. Alternatively, the existing "3gpp-Sbi-Sender-Timestamp" header (for example, as defined in TS29.500, sec. 5.2.3.3.2) can be used to carry the temporal information. In this case, the sending NF 110 may add two headers, that is, "3gpp-Sbi-SendingNFInfo" header that includes the identification information such as NFInstanceInfo (and optionally certificate information for end to end authentication, as described below) and "3gpp-Sbi-Sender-Timestamp" header. Moreover, in this case, the signature may be included in the "3gpp-Sbi-SendingNFInfo" header as shown in FIG. 3 or may be included in a separated header.

In example embodiments of the present disclosure, the signature and the various types of NF info, for example the identification information, the temporal information, the NF type information and certificate information, may be transmitted all in the same header or transmitted in different headers. The signature and the various types of NF info may be transmitted in the message in other form than a header.

Reference is now made back to FIG. 2. The first SCP 130 connected to the sending NF 110 may perform 215 discovery, selection and access token request procedures. After receiving the message from the sending NF 110, the first SCP 130 validates 220 the signature in message. For example, the first SCP 130 may validate the signature in the HTTP header using the public key of the sending NF 110 available in the TLS client certificate, which has been provided by the sending NF 110 during TLS handshake. Alternatively, if the signature is generated based on the new certificate, a public key available in the new certificate may be used. For the example as shown in FIG. 3, the signature in the "Signature" field 313 may be validated by the first SCP 130, which in this case is a SCPc.

If the signature is successfully validated, the first SCP 130 updates 225 the message. The first SCP 130 then transmits 230 or forwards the updated message to the second SCP 140 with which the first SCP 130 has established a mutually authenticated TLS connection.

In some example embodiments, to update the message, the first SCP 130 may generate its own signature and replace the signature of the sending NF 110 in the message (for example, in the HTTP header) with its own signature. Reference is made to FIG. 3. The example header 320 in the updated message has been changed as compared with the example header 310. The "NFInstanceInfo" field 311 and the "Timestamp" field 312 remain unchanged. In the "Signature" field 323, the signature of the sending NF 110 is replaced by the signature of the first SCP 130. In the example, the signature in the "Signature" field 323 may be generated by signing the content or an abstract of the content of "NFInstanceInfo" and "Timestamp" with the private key of the first SCP 130, which is shown as "PrSCPc" in the example.

Still referring to FIG. 2, after receiving the updated message from the first SCP 130, the second SCP 140 validates 235 the signature in updated message, that is, the signature of the first SCP 130. The second SCP 140 may validate the signature in the HTTP header using the public key of the first SCP 130 available in the TLS client certificate, which has been provided by the first SCP 130 during TLS handshake. For the example as shown in FIG. 3, the signature in the "Signature" field 323 may be validated by the second SCP 140, which in this case is a SCPp.

If the signature is successfully validated, the second SCP 140 further updates 240 the message. The second SCP 140 then transmits 245 or forwards the further updated message to the receiving NF 120 with which the second SCP 140 has established a mutually authenticated TLS connection. The receiving NF 120 may act as a NFp in case of a Service Request or may act as a NFc in case of a Notification message.

In some example embodiments, to update the message, the second SCP 140 may generate its own signature and replace the signature of the first SCP 130 in the message (for example, in the HTTP header) with its own signature. Reference is made to FIG. 3. The example header 330 in the further updated message has been changed as compared with the example header 320. The "NFInstanceInfo" field 311 and the "Timestamp" field 312 remain unchanged. In the "Signature" field 333, the signature of the first SCP 130 is replaced by the signature of the second SCP 140. In the example, the signature in the "Signature" field 333 may be generated by signing the content or an abstract of the content of "NFInstanceInfo" and "Timestamp" with the private key of the second SCP 140, which is shown as "PrSCPp" in the example.

Still referring to FIG. 2, after receiving the further updated message from the second SCP 140, the receiving NF 120 validates 250 the signature in the further updated message, that is, the signature of the second SCP 140. The receiving NF 120 may validate the signature in the HTTP header using the public key of the second SCP 140 available in the TLS client certificate, which has been provided by the second SCP 140 during TLS handshake. For the example as shown in FIG. 3, the signature in the "Signature" field 333 may be validated by the receiving NF 120, which in this case is a NFp.

In some example embodiments where the NF info comprises the temporal information, if the signature is successfully validated, the receiving NF 120 may perform 255 a validation of time window at least partially based on the temporal information. For example, in the case where the timestamp is included in the message, the receiving NF 120 may verify where the timestamp is within a certain time window, for example an acceptable time window. In such example embodiments, the replay protection can be achieved. It is to be understood that if the timestamp is still valid but the certificate which was used originally for signing has expired or been revoked then the message (for example, service request) is no longer valid/acceptable.

As mentioned above, in some example embodiments, the temporal information may further include delay information, for example "AcceptableDelay". In such example embodiments, the receiving NF 120 may determine the valid time window based on the delay information. In some example embodiments, alternatively, the receiving NF 120 may determine the valid time window based on an estimate of the hop by hop delay, etc.

After successful validation of the signature and optionally the temporal information, the receiving NF obtains 260 the identification information of the sending NF 110 from the message received from the second SCP 140. For example, the receiving NF 120 may obtain the NF Instance Id or NF Set Id or FQDN of the sending NF 110 from the header, for example the header 330 as shown in FIG. 3.

The example process 200 is described with respect to the configuration where there are two SCPs between the two communicating NFs. It is to be understood that the solution of the present disclosure can also be applied to configurations where both the sending and receiving NFs are connected to the same SCP. In such configurations, the SCP will forward the updated message to the receiving NF. An example of this scenario is the case where a NFc is requesting service from a NRF. Both the NFc and the NRF may be connected to the same SCP.

In some example embodiments, end to end (e2e) authentication may be enabled between the two communicating NFs. This is useful in scenarios where end to end authentication is required between the two NFs for critical service operations. The solution of the present disclosure can provide the additional feature of end to end authentication.

When e2e authentication is enabled, the sending NF's signature for example in "Signature" field is forwarded end to end and validated by the receiving NF. This requires the receiving NF to have access to the public key of the sending NF. Accordingly, certificate information of the sending NF needs to be carried in the message directed from the sending NF to the receiving NF. For example, an additional "Cert" field may be used to carry a certificate of the sending NF, for example the TLS certificate or a new certificate if provisioned by the operator. The certificate (TLS certificate or a newly provisioned certificate) is carried end-to-end and available to the receiving NF. The one or more intermediate node (such as SCP) may append its signature in the message, for example, in a new field called "SCP Signature". Similar as mentioned above, when e2e authentication is enabled, the sending NF may be a NFc, and can also be a NFp or NRF for callback Uniform Resource Identifiers (URIs) or other notifications.

Accordingly, in the example embodiments where the end to end authentication is enabled, additional two fields may be required. Two example fields, "Cert" and "SCP Signature" fields in the header are shown below:
  a) "Cert": <TLS certificate of the sending NF>//added by the sending NF or by the SCP connected to the sending NF;
  b) "SCP Signature": SIGN [3gpp-Sbi-SendingNFInfoNFInstanceInfo+Timestamp] Private key of the SCP.

Figure 4:
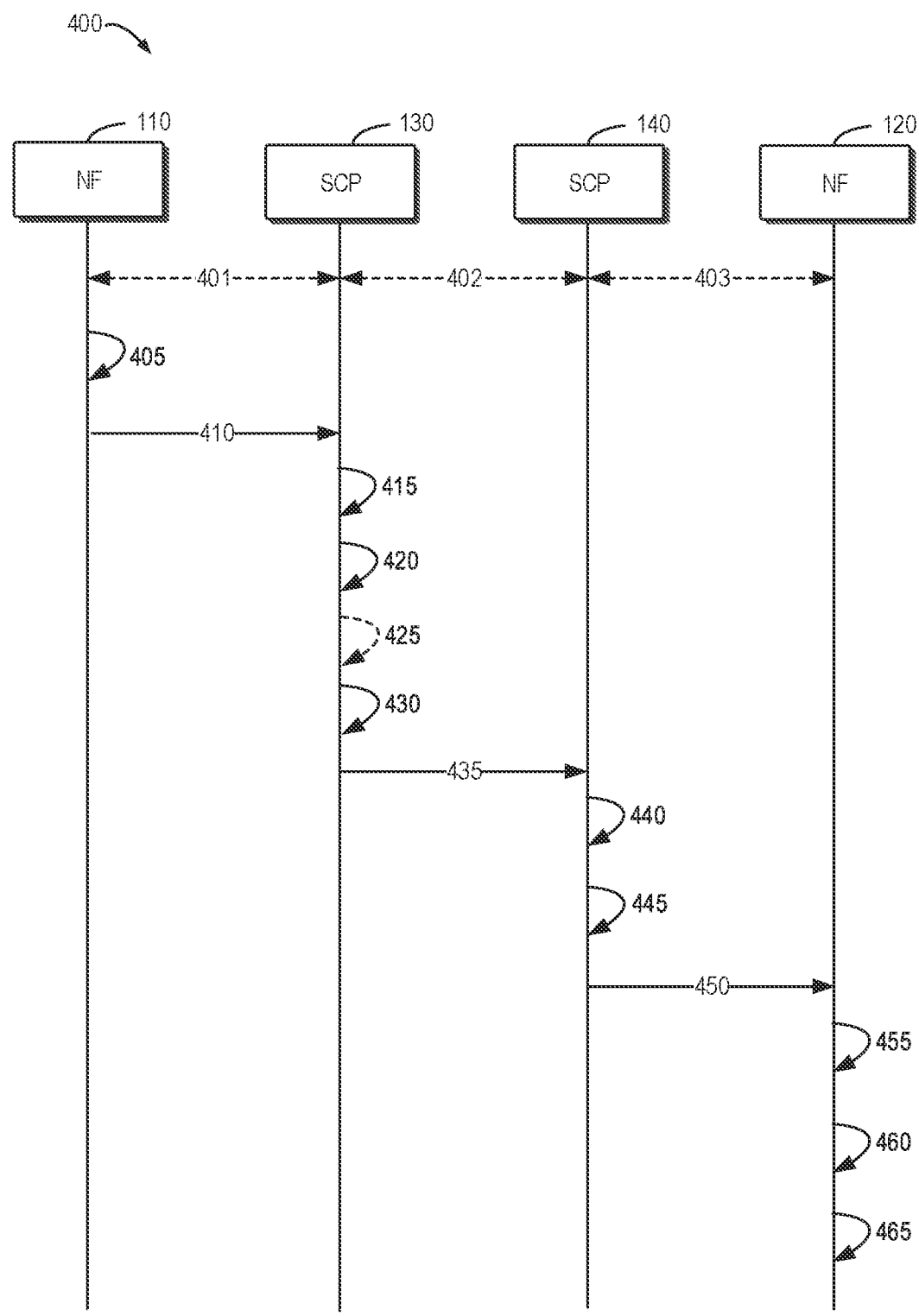
FIG. 4 illustrates an interaction diagram of an example process for end to end authentication in indirect communication according to some example embodiments of the present disclosure.

Reference is now made to FIG. 4, which illustrates an interaction diagram of an example process 400 for end to end authentication in indirect communication according to some example embodiments of the present disclosure. As shown in FIG. 4, the process 400 may involve the NF 110, the SCP 130 and the SCP 140, and the NF 120 as shown in FIG. 1.

Similar as described with reference to FIG. 2, in some example embodiments as a pre-requisite, mutual authentication between the NF 110 and the SCP 130 is performed 401, mutual authentication between the SCP 130 and the SCP 140 is performed 402, and mutual authentication between the NF 120 and the SCP 140 is performed 403. For example, TLS handshake procedures may be performed for the mutual authentications. Such procedures are similar with those described with reference to FIG. 2 and will not be repeated here.

The sending NF 110 may intend to transmit a message to the receiving NF 120. For example, in the case where the sending NF 110 acts a NFc and the receiving NF 120 acts as a NFp, such a message may be a Service Request.

A signature and NF info of the sending NF 110 may be inserted in the message directed to the receiving NF 120. To enable the e2e authentication, in addition to the identification information and temporal information as described above, the certificate information of the sending NF 110 is required, for example as part of the NF info. In some example embodiments, the sending NF 110 per se may insert the certificate information of the sending NF 110 in the message directed to the receiving NF 120. In this case, the NF info may at least comprise the identification information and the certificate information of the sending NF 110 and may further comprise temporal information.

The sending NF 110 generates 405 a signature. For example, the sending NF 110 may generate the signature based on the NF info to be transmitted and the private key of the sending NF 110. This digital signature may be generated using the private key corresponding to the public key in the TLS certificate. Alternatively, a new certificate may be provisioned by the operator for generating the digital signature. This additionally means that this new certificate is made available to all entities that need to validate the signature.

Then, the sending NF 110 may generate the message including the NF info and the signature specific to the sending NF 110. The message (for example, Service Request) is transmitted 410 or forwarded to the first SCP 130 to which the sending NF 110 is communicating with and has established a secure TLS based connection.

Figure 5:
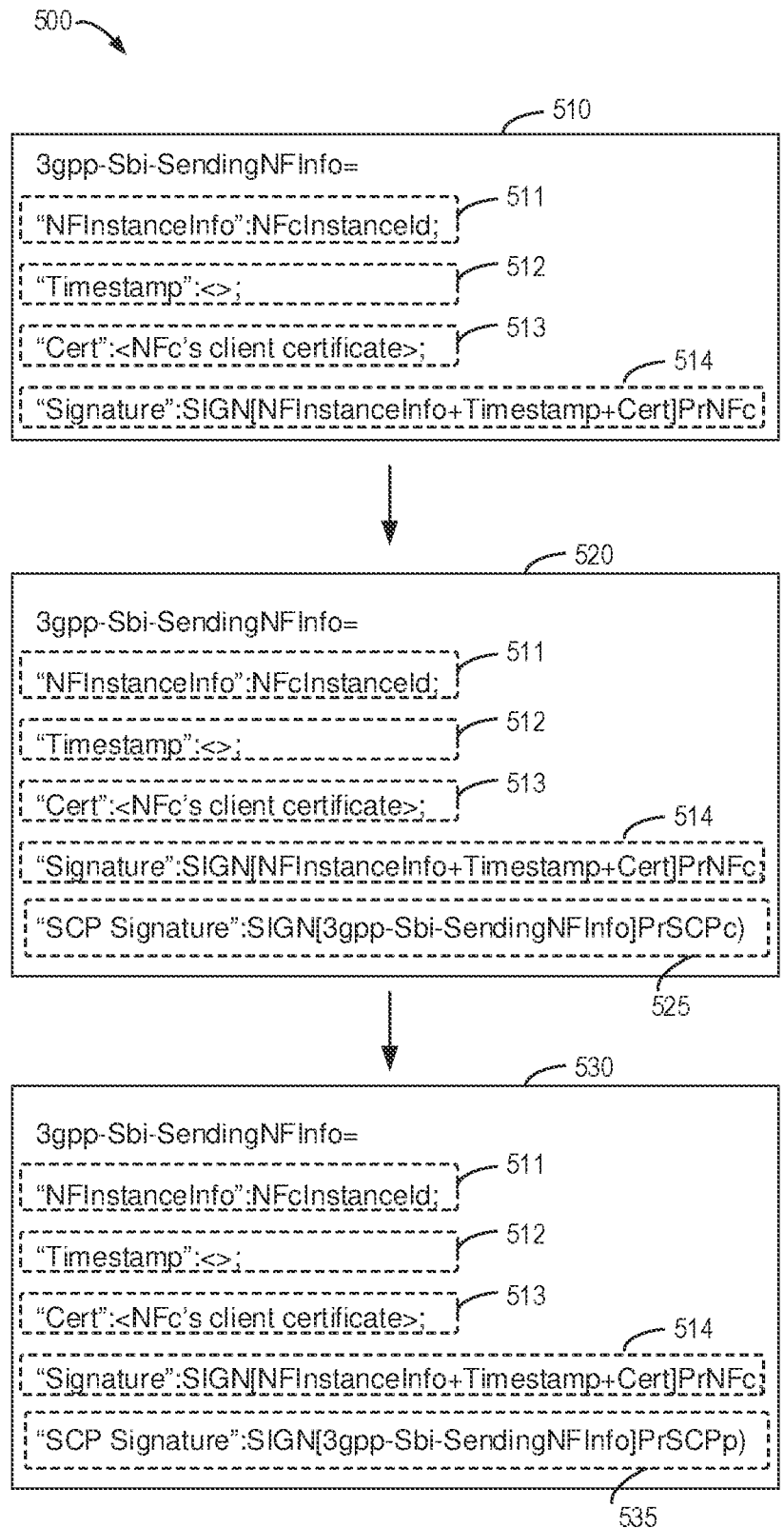
FIG. 5 illustrates a schematic diagram showing example headers during indirect communication according to some example embodiments of the present disclosure.

Similar as described above, the NF info and the signature may be transmitted in a header which is inserted into the message. Reference is now made to FIG. 5, which illustrates a schematic diagram 500 showing example headers during indirect communication according to some example embodiments of the present disclosure. In the example, the example header 510, named "3gpp-Sbi-SendingNFInfo", may be inserted by the sending NF 110. Moreover, in the example, the sending NF 110 acts as a NFc and the message transmitted 210 is the Service Request.

The "NFInstanceInfo" field 511 and the "Timestamp" field 512 are similar as the "NFInstanceInfo" field 311 and the "Timestamp" field 312 as described with respect to FIG. 3 and description thereof is not repeated here. The "Cert" field 513 represents the certificate information. In this example, the "Cert" field 513 is shown to contain the client certificate of the sending NF 110, "NFc's client certificate".

The "Signature" field 514 of the header 510 contains the signature appended by the sending NF 110 for "NFInstanceInfo", "Timestamp" and "Cert". The signature in the "Signature" field 514 may be generated by signing the content or an abstract of the content of "NFInstanceInfo", "Timestamp" and "Cert" with the private key of the sending NF 110, which is shown as "PrNFc" in the example. Although not shown in FIG. 5, the algorithm used to generate the signature may be also included in the header 510, for example in the field of "Algorithm". Such a header or similar header may be also referred to as HTTP header.

It is to be understood that other aspects described above with reference to FIG. 3 also can be applied to the process 400.

Reference is now made back to FIG. 4. The first SCP 130 connected to the sending NF 110 may perform 415 discovery, selection and access token request procedures. After receiving the message from the sending NF 110, the first SCP 130 validates 420 the signature in message. The first SCP 130 may validate the signature in the HTTP header using the public key of the sending NF 110 available in the TLS client certificate, which has been provided by the sending NF 110 during TLS handshake. For the example as shown in FIG. 4, the signature in the "Signature" field 514 may be validated by the first SCP 130, which in this case is a SCPc.

If the signature is successfully validated, the first SCP 130 updates 430 the message. The first SCP 130 then transmits 435 or forwards the updated message to the second SCP 140 with which the first SCP 130 has established a mutually authenticated TLS connection.

In such example embodiments where the e2e authentication is enabled, to update the message, the first SCP 130 may generate its own signature (which may be referred to as a SCP signature in the following) and add the SCP signature in the message (for example, in the HTTP header). Reference is made to FIG. 5. The example header 520 in the updated message has been changed as compared with the example header 510. The "NFInstanceInfo" field 511, the "Timestamp" field 512, the "Cert" field 513 and the "Signature" field 514 remain unchanged.

The "SCP Signature" field 525 is inserted by the first SCP 130. In the example, the SCP signature in the "SCP Signature" field 525 may be generated by signing the content or an abstract of the content of "3gpp-Sbi-SendingNFInfo" with the private key of the first SCP 130, which is shown as "PrSCPc" in the example. In other words, the SCP signature specific to the first SCP 130 in the "SCP Signature" field 525 may be generated based on the signature of the sending NF 110 and the NF info, which in this example includes identification information (e.g., "NFInstanceInfo"), the temporal information (e.g., "Timestamp") and the certificate information (e.g., "Cert").

Still referring to FIG. 4, after receiving the updated message from the first SCP 130, the second SCP 140 validates 440 the SCP signature in updated message, that is, the signature of the first SCP 130. The second SCP 140 may validate the SCP signature in the HTTP header using the public key of the first SCP 130 available in the TLS client certificate, which has been provided by the first SCP 130 during TLS handshake. For the example as shown in FIG. 5, the signature in the "SCP Signature" field 525 may be validated by the second SCP 140, which in this case is a SCPp.

If the SCP signature is successfully validated, the second SCP 140 further updates 445 the message. The second SCP 140 then transmits 450 or forwards the further updated message to the receiving NF 120 with which the second SCP 140 has established a mutually authenticated TLS connection.

In such example embodiments where the e2e authentication is enabled, to update the message, the second SCP 140 may generate its own SCP signature and replace the SCP signature of the first SCP 130 in the message (for example, in the HTTP header) with its own SCP signature. Reference is made to FIG. 5. The example header 530 in the further updated message has been changed as compared with the example header 520. The "NFInstanceInfo" field 511, the "Timestamp" field 512, the "Cert" field 513 and the "Signature" field 514 still remain unchanged.

In the "SCP Signature" field 535, the SCP signature of the first SCP 130 is replaced by the SCP signature of the second SCP 140. In the example, the SCP signature in the "SCP Signature" field 535 may be generated by signing the content or an abstract of the content of "3gpp-Sbi-SendingNFInfo" with the private key of the second SCP 140, which is shown as "PrSCPp" in the example. In other words, the SCP signature specific to the second SCP 140 in the "SCP Signature" field 535 may be generated based on the signature of the sending NF 110 and the NF info, which in this example includes identification information (e.g., "NFInstanceInfo"), the temporal information (e.g., "Timestamp") and the certificate information (e.g., "Cert").

Still referring to FIG. 4, after receiving the further updated message from the second SCP 140, the receiving NF 120 validates 455 the SCP signature in the further updated message, that is, the SCP signature of the second SCP 140. The receiving NF 120 may validate the SCP signature in the HTTP header using the public key of the second SCP 140 available in the TLS client certificate, which has been provided by the second SCP 140 during TLS handshake. For the example as shown in FIG. 5, the SCP signature in the "SCP Signature" field 535 may be validated by the receiving NF 120, which in this case is a NFp.

If the SCP signature of the second SCP 140 is successfully validated, the receiving NF 120 may obtain the certificate information of the sending NF 110, for example the client certificate of the sending NF 110. Then, the receiving NF 120 validates 460 the signature of the sending NF 110. For the example as shown in FIG. 5, the signature in the "Signature" field 514 may be validated by the receiving NF 120 for example by using the client certificate of the sending NF 110.

After successful validation of the signature of the sending NF 110, the receiving NF obtains 465 the identification information of the sending NF 110 from the message forwarded by the second SCP 140. For example, the receiving NF 120 may obtain the NF Instance Id or NF Set Id or FQDN of the sending NF 110 from the header, for example the header 530 as shown in FIG. 5.

In some example embodiments where the NF info comprises the temporal information, the receiving NF 120 may perform a validation of time window, similarly as described above with reference to FIG. 2.

In the above description made with respect to FIG. 4, the sending NF may append its signature and client certificate in the HTTP header. This is sent by an e2e way to the receiving NF. The receiving NF can verify Proof of Possession to validate the sending NF's signature using the public key obtained from the client certificate. In this way, an end to end authentication can be achieved to support the scenarios where end to end authentication is required between the two NFs for critical service operations.

In the above description, the certificate information of the sending NF is inserted into the message by the sending NF per se. Alternatively, in some other example embodiments, the certificate information of the sending NF may be inserted by the SCP with which the sending NF is communicating and has established a secure TLS based connection or by the SCP acting as a side-car proxy to the NF. Still referring to FIG. 4, in such example embodiments, the second SCP 130 may insert 425 the certificate information of the sending NF 110 into the message. For example, the second SCP 130 may insert the client certificate of the sending NF 110 obtained during the TLS handshake into the message. Alternatively, the certificate inserted may be provisioned separately by the operator if a different certificate is used for digital signatures.

The certificate information of the sending NF 110 may be or comprise the client certificate of the sending NF 110. Alternatively or additionally, the certificate information of the sending NF 110 may comprise an address which enables obtaining of a client certificate or a public key of the sending NF 110. For example, a Uniform Resource Locator (URL), which points to the location where client's public key or client certificate can be obtained by the receiving NF 120, may be inserted. Instead of inserting the certificate, inserting the address (for example, URL) can reduce the overhead of the message.

Although not shown in FIGS. 2 and 4, for the first SCP 130, the second SCP 140 and the receiving NF 120, if signature validation fails or timestamp validation indicates potential replay attack, then the receiving entity or node may send an appropriate (security) failure response to the receiving entity or node.

It is to be understood that the proposed solution is not bound to NFc but can also be used to identify in general for a HTTP client that generates notifications. It provides means to the receiver of the communication (direct or indirect) to identify the source of communication.

More details of the example embodiments in accordance with the present disclosure will be described with reference to FIGS. 6-8.

Figure 6:
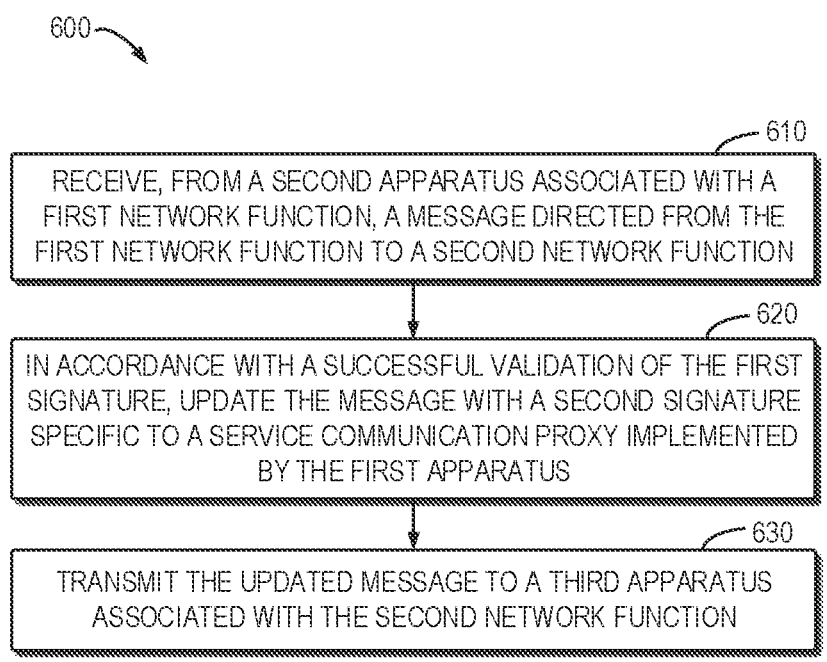
FIG. 6 illustrates a flowchart of an example method according to some example embodiments of the present disclosure.

FIG. 6 shows a flowchart of an example method 600 according to some example embodiments of the present disclosure. The method 600 can be implemented at any suitable device. For example, the method 600 can be implemented at a first apparatus, which is configured to implement the SCP 130 or 140 in FIG. 1. For the purpose of discussion, the method 600 will be described with reference to FIG. 1.

At block 610, the first apparatus receives, from a second apparatus associated with a first NF 110, a message directed from the first NF 110 to a second NF 120, the message comprising a first signature and network function information, the network function information at least comprising identification information of the first NF 110. At block 620, in accordance with a successful validation of the first signature, the first apparatus updates the message with a second signature specific to a service communication proxy implemented by the first apparatus. At block 630, the first apparatus transmits the updated message to a third apparatus associated with the second NF 120, the updated message comprising at least the second signature and the network function information.

In some example embodiments, updating the message with the second signature comprises: generating the second signature based on the network function information and a private key of the service communication proxy; and replacing the first signature in the message with the second signature.

In some example embodiments, the network function information further comprises certificate information of the first NF 110, the second apparatus is configured to implement the first NF 110, and updating the message with the second signature comprises: generating the second signature at least based on the first signature and a private key of the service communication proxy; and inserting the second signature into the message.

In some example embodiments, the second apparatus is configured to implement the first NF 110, and updating the message with the second signature comprises: inserting certificate information of the first NF 110 into the message as part of the network function information; generating the second signature at least based on the first signature and a private key of the service communication proxy; and inserting the second signature into the message.

In some example embodiments, the network function information further comprises certificate information of the first NF 110, the second apparatus is configured to implement a further service communication proxy connected to the first NF 110, and updating the message with the second signature comprises: generating the second signature at least based on the first signature and a private key of the service communication proxy; and replacing the first signature in the message with the second signature.

In some example embodiments, the message further comprises a third signature specific to the first NF 110, and wherein the third apparatus is configured to implement the second NF 120.

In some example embodiments, the certificate information of the first NF 110 comprises at least one of: a client certificate of the first NF 110, or an address which enables obtaining of a client certificate or a public key of the first network device.

In some example embodiments, the network function information further comprises at least one of: type information of the first NF 110, or temporal information concerning transmission of the message.

In some example embodiments, the identification information of the first NF 110 comprises at least one of: an instance identifier of the first NF 110, a set identifier of the first NF 110, or FQDN of the first NF 110.

Figure 7:
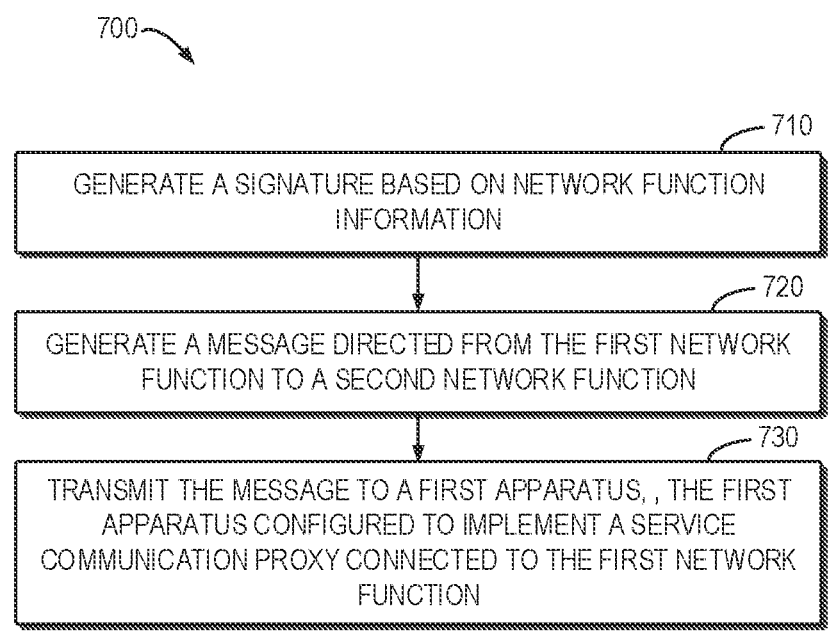
FIG. 7 illustrates a flowchart of an example method according to some example embodiments of the present disclosure.

FIG. 7 shows a flowchart of an example method 700 according to some example embodiments of the present disclosure. The method 700 can be implemented at any suitable device. For example, the method 700 can be implemented at a second apparatus, which is configured to implement the receiving NF 110 as in FIG. 1. For the purpose of discussion, the method 700 will be described with reference to FIG. 1.

At block 710, the second apparatus generates a signature based on network function information, the network function information at least comprising identification information of the first NF 110, the signature specific to a first NF 110 implemented by the second apparatus. At block 720, the second apparatus generates a message directed from the first NF 110 to a second NF 120, the message comprising the signature and the network function information. At block 730, the second apparatus transmits the message to a first apparatus, the first apparatus configured to implement a service communication proxy connected to the first NF 110 or to implement the second NF 120.

In some example embodiments, the network function information further comprises at least one of: certificate information of the first NF 110, type information of the first NF 110, or temporal information concerning transmission of the message.

In some example embodiments, the certificate information of the first NF 110 comprises at least one of: a client certificate of the first NF 110, or an address which enables obtaining of a client certificate or a public key of the first network device.

In some example embodiments, the identification information of the first NF 110 comprises at least one of: an instance identifier of the first NF 110, a set identifier of the first NF 110, or FQDN of the first NF 110.

Figure 8:
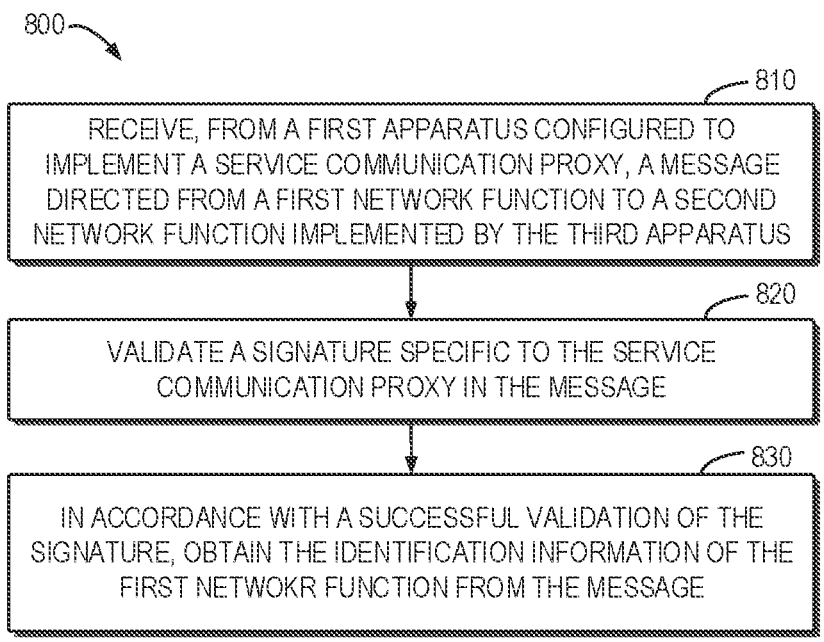
FIG. 8 illustrates a flowchart of an example method according to some example embodiments of the present disclosure.

FIG. 8 shows a flowchart of an example method 800 according to some example embodiments of the present disclosure. The method 800 can be implemented at any suitable device. For example, the method 800 can be implemented at a third apparatus, which is configured to implement the sending NF 120 as in FIG. 1. For the purpose of discussion, the method 800 will be described with reference to FIG. 1.

At block 810, the third apparatus receives, from a first apparatus configured to implement a service communication proxy, a message directed from a first NF 110 to a second NF 120 implemented by the third apparatus. At block 820, the third apparatus validates a signature specific to the service communication proxy in the message, the message further comprising network function information, the network function information at least comprising identification information of the first NF 110. At block 830, in accordance with a successful validation of the signature, the third apparatus obtains the identification information of the first network function from the message.

In some example embodiments, validating the signature specific to the service communication proxy in the message comprises: validating the signature using a public key of the service communication proxy.

In some example embodiments, the network function information further comprises certificate information of the first NF 110, and obtaining the identification information comprises: in accordance with the successful validation of the signature, obtaining the certificate information from the message: validating a further signature specific to the first NF 110 in the message using the obtained certificate information; and in accordance with a successful validation of the further signature, obtaining the identification information of the first network function from the message.

In some example embodiments, the certificate information of the first NF 110 comprises at least one of: a client certificate of the first NF 110, or an address which enables obtaining of a client certificate or a public key of the first network device.

In some example embodiments, the network function information further comprises temporal information concerning transmission of the message, and the method further comprises: in accordance with the successful validation of the signature, performing a validation of time window at least partially based on the temporal information; and in accordance with a determination of an invalid time window, transmitting a failure response to the first apparatus.

In some example embodiments, the identification information of the first NF 110 comprises at least one of: an instance identifier of the first NF 110, a set identifier of the first NF 110, or FQDN of the first NF 110.

In some example embodiments, a first apparatus capable of performing the method 600 may comprise means for performing the respective steps of the method 600. The means may be implemented in any suitable form. For example, the means may be implemented in a circuitry or software module.

The first apparatus comprising: means for receiving, from a second apparatus associated with a first network function, a message directed from the first network function to a second network function, the message comprising a first signature and network function information, the network function information at least comprising identification information of the first network function; means for in accordance with a successful validation of the first signature, updating the message with a second signature specific to a service communication proxy implemented by the first apparatus; and means for transmitting the updated message to a third apparatus associated with the second network function, the updated message comprising at least the second signature and the network function information.

In some example embodiments, the means for updating the message with the second signature comprises: means for generating the second signature based on the network function information and a private key of the service communication proxy; and means for replacing the first signature in the message with the second signature.

In some example embodiments, the network function information further comprises certificate information of the first network function, the second apparatus is configured to implement the first network function, and the means for updating the message with the second signature comprises: means for generating the second signature at least based on the first signature and a private key of the service communication proxy; and means for inserting the second signature into the message.

In some example embodiments, the second apparatus is configured to implement the first network function, and the means for updating the message with the second signature comprises: means for inserting certificate information of the first network function into the message as part of the network function information: means for generating the second signature at least based on the first signature and a private key of the service communication proxy; and means for inserting the second signature into the message.

In some example embodiments, the network function information further comprises certificate information of the first network function, the second apparatus is configured to implement a further service communication proxy connected to the first network function, and the means for updating the message with the second signature comprises: means for generating the second signature at least based on the first signature and a private key of the service communication proxy; and means for replacing the first signature in the message with the second signature.

In some example embodiments, the message further comprises a third signature specific to the first network function, and wherein the third apparatus is configured to implement the second network function.

In some example embodiments, the certificate information of the first network function comprises at least one of: a client certificate of the first network function, or an address which enables obtaining of a client certificate or a public key of the first network device.

In some example embodiments, the network function information further comprises at least one of: type information of the first network function, or temporal information concerning transmission of the message.

In some example embodiments, the identification information of the first network function comprises at least one of: an instance identifier of the first network function, a set identifier of the first network function, or FQDN of the first network function.

In some example embodiments, a second apparatus capable of performing the method 700 may comprise means for performing the respective steps of the method 700. The means may be implemented in any suitable form. For example, the means may be implemented in a circuitry or software module.

The second apparatus comprising: means for generating a signature based on network function information, the network function information at least comprising identification information of the first network function, the signature specific to a first network function implemented by the second apparatus: means for generating a message directed from the first network function to a second network function, the message comprising the signature and the network function information; and means for transmitting the message to a first apparatus, the first apparatus configured to implement a service communication proxy connected to the first network function or to implement the second network function.

In some example embodiments, the network function information further comprises at least one of: certificate information of the first network function, type information of the first network function, or temporal information concerning transmission of the message.

In some example embodiments, the certificate information of the first network function comprises at least one of: a client certificate of the first network function, or an address which enables obtaining of a client certificate or a public key of the first network device.

In some example embodiments, the identification information of the first network function comprises at least one of: an instance identifier of the first network function, a set identifier of the first network function, or FQDN of the first network function.

In some example embodiments, a third apparatus capable of performing the method 800 may comprise means for performing the respective steps of the method 800. The means may be implemented in any suitable form. For example, the means may be implemented in a circuitry or software module.

A third apparatus comprising: means for receiving, from a first apparatus configured to implement a service communication proxy, a message directed from a first network function to a second network function implemented by the third apparatus: means for validating a signature specific to the service communication proxy in the message, the message further comprising network function information, the network function information at least comprising identification information of the first network function; and means for in accordance with a successful validation of the signature, obtaining the identification information of the first network function from the message.

In some example embodiments, the means for validating the signature specific to the service communication proxy in the message comprises: means for validating the signature using a public key of the service communication proxy.

In some example embodiments, the network function information further comprises certificate information of the first network function, and the means for obtaining the identification information comprises: means for in accordance with the successful validation of the signature, obtaining the certificate information from the message: means for validating a further signature specific to the first network function in the message using the obtained certificate information; and means for in accordance with a successful validation of the further signature, obtaining the identification information of the first network function from the message.

In some example embodiments, the certificate information of the first network function comprises at least one of: a client certificate of the first network function, or an address which enables obtaining of a client certificate or a public key of the first network device.

In some example embodiments, the network function information further comprises temporal information concerning transmission of the message, and the third apparatus further comprises: means for in accordance with the successful validation of the signature, performing a validation of time window at least partially based on the temporal information; and means for in accordance with a determination of an invalid time window, transmitting a failure response to the first apparatus.

In some example embodiments, the identification information of the first network function comprises at least one of: an instance identifier of the first network function, a set identifier of the first network function, or FQDN of the first network function.

Figure 9:
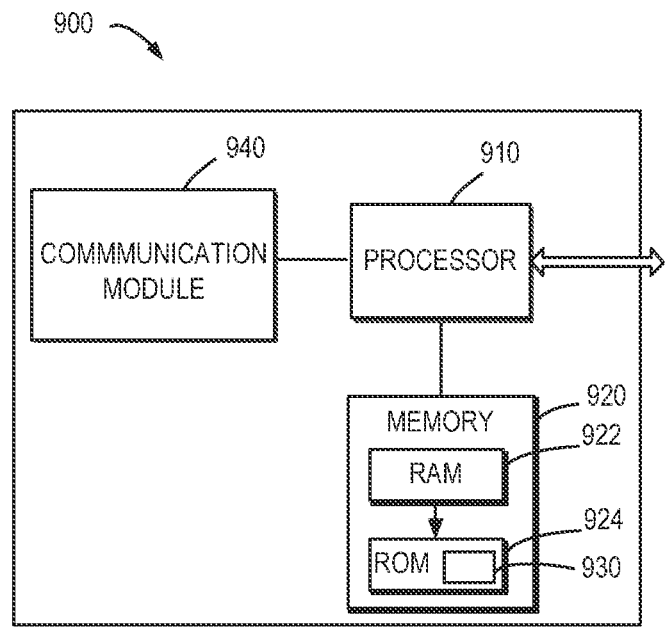
FIG. 9 illustrates a simplified block diagram of an apparatus that is suitable for implementing embodiments of the present disclosure.

FIG. 9 is a simplified block diagram of a device 900 that is suitable for implementing embodiments of the present disclosure. The device 900 may be provided to implement the communication device as shown in FIG. 1. As shown, the device 900 includes one or more processors 910, one or more memories 920 coupled to the processor 910, and one or more communication modules 940 coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 920. The processor 910 may perform any suitable actions and processing by loading the program 930 into the RAM 920.

The embodiments of the present disclosure may be implemented by means of the program 930 so that the device 900 may perform any process of the disclosure as discussed with reference to FIGS. 6 to 8. The embodiments of the present disclosure may also be implemented by hardware or by a combination of software and hardware.

Figure 10:
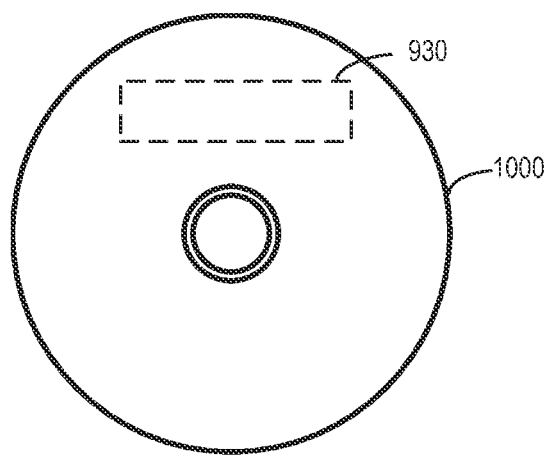
FIG. 10 illustrates a block diagram of an example computer readable medium in accordance with some example embodiments of the present disclosure.

In some embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operatively coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 900 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the device 900 may be instead comprised in the distributed unit, and at least some of the described processes may be performed by the distributed unit.

In an embodiment, the execution of at least some of the functionalities of the device 900 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 900 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 600, 700 or 800 as described above with reference to FIGS. 6-8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus, configured to implement a service communication proxy connected to a first network function, the first apparatus comprising:
at least one processor; and
at least one memory including computer program codes;
the at least one memory and the computer program codes are configured to, with the at least one processor, cause the first apparatus to:
receive, from a second apparatus associated with the first network function, a message directed from the first network function to a second network function, the message comprising a first signature and network function information, the network function information at least comprising identification information of the first network function;
in accordance with a successful validation of the first signature, update the message with a second signature specific to the service communication proxy implemented by the first apparatus; and
transmit the updated message to a third apparatus associated with the second network function, the updated message comprising at least the second signature and the network function information,
wherein the network function information further comprises certificate information of the first network function, the second apparatus is configured to implement the first network function, and the first apparatus is caused to:
generate the second signature at least based on the first signature and a private key of the service communication proxy; and
insert the second signature into the message.

2. The apparatus of claim 1, wherein the certificate information of the first network function comprises at least one of:
a client certificate of the first network function, or
an address which enables obtaining of a client certificate or a public key of the first network device.

3. The apparatus of claim 1, wherein the identification information of the first network function comprises at least one of:
an instance identifier of the first network function,
a set identifier of the first network function, or
Fully Qualified Domain Name of the first network function.

4. The apparatus of claim 1, wherein the first network function is a network function service consumer and the second network function is a network function service producer.

5. A first apparatus,
configured to implement a service communication proxy connected to a first network function, the first apparatus comprising:
at least one processor; and
at least one memory including computer program codes;
the at least one memory and the computer program codes are configured to, with the at least one processor, cause the first apparatus to:
receive, from a second apparatus associated with the first network function, a message directed from the first network function to a second network function, the message comprising a first signature and network function information, the network function information at least comprising identification information of the first network function;
in accordance with a successful validation of the first signature, update the message with a second signature specific to the service communication proxy implemented by the first apparatus; and
transmit the updated message to a third apparatus associated with the second network function, the updated message comprising at least the second signature and the network function information, wherein the second apparatus is configured to implement the first network function, and the first apparatus is further caused to:

insert certificate information of the first network function into the message as part of the network function information;

generate the second signature at least based on the first signature and a private key of the service communication proxy; and insert the second signature into the message.

6. The apparatus of claim 5, wherein the network function information further comprises at least one of:

type information of the first network function, or temporal information concerning transmission of the message.

7. The apparatus of claim 5, wherein the identification information of the first network function comprises at least one of:

an instance identifier of the first network function, a set identifier of the first network function, or Fully Qualified Domain Name of the first network function.

8. The apparatus of claim 5, wherein the first network function is a network function service consumer and the second network function is a network function service producer.

9. A first apparatus, configured to implement a service communication proxy connected to a first network function, the first apparatus comprising:

at least one processor; and at least one memory including computer program codes;

the at least one memory and the computer program codes are configured to, with the at least one processor, cause the first apparatus to:

receive, from a second apparatus associated with the first network function, a message directed from the first network function to a second network function, the message comprising a first signature and network function information, the network function information at least comprising identification information of the first network function;

in accordance with a successful validation of the first signature, update the message with a second signature specific to the service communication proxy implemented by the first apparatus; and transmit the updated message to a third apparatus associated with the second network function, the updated message comprising at least the second signature and the network function information, wherein the network function information further comprises certificate information of the first network function, the second apparatus is configured to implement a further service communication proxy connected to the first network function, and the first apparatus is caused to:

generate the second signature at least based on the first signature and a private key of the service communication proxy; and replace the first signature in the message with the second signature.

10. The apparatus of claim 9, wherein the message further comprises a third signature specific to the first network function, and wherein the third apparatus is configured to implement the second network function.

11. The apparatus of claim 9, wherein the identification information of the first network function comprises at least one of:

an instance identifier of the first network function, a set identifier of the first network function, or Fully Qualified Domain Name of the first network function.

12. The apparatus of claim 9, wherein the first network function is a network function service consumer and the second network function is a network function service producer.

13. A second apparatus configured to implement a first network function, the second apparatus comprising:

at least one processor; and at least one memory including computer program codes;

the at least one memory and the computer program codes are configured to, with the at least one processor, cause the second apparatus to:

generate a signature based on network function information, the network function information at least comprising identification information of the first network function, the signature specific to the first network function implemented by the second apparatus;

generate a message directed from the first network function to a second network function, the message comprising the signature and the network function information; and transmit the message to a first apparatus, the first apparatus configured to implement a service communication proxy connected to the first network function, wherein the network function information further comprises at least one of:

certificate information of the first network function, type information of the first network function, or temporal information concerning transmission of the message, and wherein the certificate information of the first network function comprises at least one of:

a client certificate of the first network function, or an address which enables obtaining of a client certificate or a public key of the first network device.

14. The apparatus of claim 13, wherein the identification information of the first network function comprises at least one of:

an instance identifier of the first network function, a set identifier of the first network function, or Fully Qualified Domain Name of the first network function.

15. The apparatus of claim 13, wherein the first network function is a network function service consumer and the second network function is a network function service producer.

16. A method comprising:

generating, at a second apparatus configured to implement a first network function, a signature based on network function information, the network function information at least comprising identification information of the first network function, the signature specific to the first network function implemented by the second apparatus;

generating a message directed from the first network function to a second network function, the message comprising the signature and the network function information; and transmitting the message to a first apparatus, the first apparatus configured to implement a service communication proxy connected to the first network function, wherein the network function information further comprises at least one of:
certificate information of the first network function,
type information of the first network function, or
temporal information concerning transmission of the message, and
wherein the certificate information of the first network function comprises at least one of:
a client certificate of the first network function, or
an address which enables obtaining of a client certificate or a public key of the first network device.

17. The method of claim 16, wherein the identification information of the first network function comprises at least one of:
an instance identifier of the first network function,
a set identifier of the first network function, or
Fully Qualified Domain Name of the first network function.

18. A first apparatus, configured to implement a service communication proxy connected to a first network function, the first apparatus comprising:
at least one processor; and
at least one memory including computer program codes;
the at least one memory and the computer program codes are configured to, with the at least one processor, cause the first apparatus to:
receive, from a second apparatus associated with the first network function, a message directed from the first network function to a second network function, the message comprising a first signature and network function information, the network function information at least comprising identification information of the first network function;
in accordance with a successful validation of the first signature, update the message with a second signature specific to the service communication proxy implemented by the first apparatus;
transmit the updated message to a third apparatus associated with the second network function, the updated message comprising at least the second signature and the network function information; and,
perform mutual authentication with the second apparatus associated with the first network function and with the third apparatus associated with the second network function.

19. A second apparatus configured to implement a first network function, the second apparatus comprising:
at least one processor; and
at least one memory including computer program codes;
the at least one memory and the computer program codes are configured to, with the at least one processor, cause the second apparatus to:
generate a signature based on network function information, the network function information at least comprising identification information of the first network function, the signature specific to the first network function implemented by the second apparatus;
generate a message directed from the first network function to a second network function, the message comprising the signature and the network function information;
transmit the message to a first apparatus, the first apparatus configured to implement a service communication proxy connected to the first network function; and,
perform mutual authentication with the service communication proxy connected to the first network function.

* * * * *